US009887942B2

(12) United States Patent
Logan et al.

(10) Patent No.: US 9,887,942 B2
(45) Date of Patent: Feb. 6, 2018

(54) METHODS AND DEVICES FOR MESSAGE ATTACHMENT TRANSMISSION

(71) Applicant: BlackBerry Limited, Waterloo (CA)

(72) Inventors: Adrian Michael Logan, Waterloo (CA); Maxwell William Byrd, Waterloo (CA); Ritwaj Ratan, Boston, MA (US); Ronesh Puri, Dundas (CA); David Andrew Brown, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 262 days.

(21) Appl. No.: 14/538,973

(22) Filed: Nov. 12, 2014

(65) Prior Publication Data

US 2016/0134572 A1 May 12, 2016

(51) Int. Cl.
*G06F 15/16* (2006.01)
*H04L 12/58* (2006.01)
*H04L 29/08* (2006.01)

(52) U.S. Cl.
CPC ............ *H04L 51/08* (2013.01); *H04L 51/063* (2013.01); *H04L 51/38* (2013.01); *H04L 67/32* (2013.01)

(58) Field of Classification Search
CPC ......... H04L 51/08; H04L 51/04; H04L 51/22; H04L 51/36; H04L 12/58; H04L 29/06; G06Q 10/107; H04M 1/72552
See application file for complete search history.

(56) References Cited

U.S. PATENT DOCUMENTS

| 6,505,237 B2* | 1/2003 | Beyda ................ G06Q 10/107 370/352 |
| 2006/0036865 A1 | 2/2006 | Brown et al. |
| 2007/0288582 A1* | 12/2007 | Major ............... G06F 17/30867 709/207 |
| 2008/0059593 A1* | 3/2008 | Ban ...................... G06Q 10/107 709/206 |
| 2009/0030995 A1* | 1/2009 | Boudreau ............ G06Q 10/107 709/206 |
| 2010/0161753 A1 | 6/2010 | Klassen et al. |
| 2012/0185546 A1* | 7/2012 | Dahiya ................... H04L 51/08 709/206 |
| 2015/0200883 A1* | 7/2015 | Brotherston ............ H04L 51/08 709/206 |

OTHER PUBLICATIONS

EESR dated Mar. 18, 2016.

\* cited by examiner

*Primary Examiner* — Aftab N Khan
*Assistant Examiner* — Anh Nguyen
(74) *Attorney, Agent, or Firm* — Rowand LLP

(57) ABSTRACT

Methods and devices for transmitting message attachments from a messaging server to a mobile device. The mobile device identifies if any of the attachments are of a first type and requests transmission, from the messaging server, of the identified attachments of the first type, if any. The device determines the remaining transmission capacity by subtracting the collective size of the message body received and the identified attachments of the first type, if any, from the initial data limit. Based on the remaining transmission capacity, the device determines that at least one of the one or more attachments, other than the identified attachments, has a size smaller than the remaining transmission capacity, and based on that determination, requests transmission of said at least one of the one or more attachments from the messaging server to the mobile device.

12 Claims, 4 Drawing Sheets

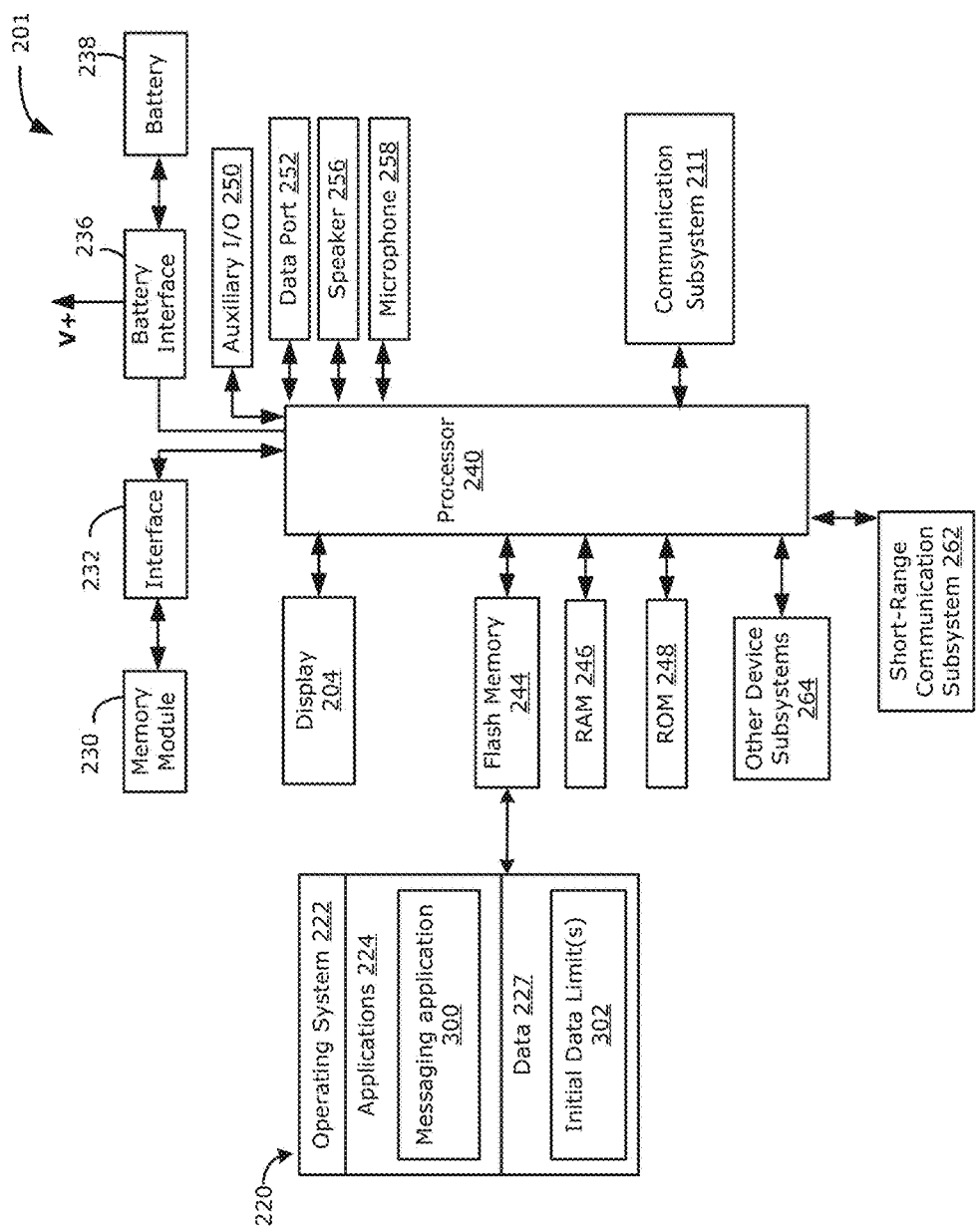

METHODS AND DEVICES FOR MESSAGE ATTACHMENT TRANSMISSION

TECHNICAL FIELD

The present disclosure relates to message transmission from a messaging server to a mobile device and, in particular, methods and devices for determining which attachments to transmit.

BACKGROUND

Modern mobile wireless devices are typically configured for data communication over a number of possible paths, including cellular networks (e.g. 3GPP, such as HPSA+, LTE UMTS, etc.) and WLANs (e.g. IEEE 802.11a/b/n WiFi, 802.16 WiMax, etc.). The cost of using these various wireless paths partly depends upon the nature or type of the communication path and the terms of access. For example, in many instances the relatively lower bandwith data path over a cellular network is typically more costly than a data connection over a WiFi network. Data use over a cellular network may be particularly costly when the mobile device is roaming. However, in some cases, WiFi networks may charge for access, in some cases with limits on data usage, and in some cases an individual service contract may provide a mobile device with unlimited data transmission over a cellular connection. Accordingly, the relative ability to cost-effectively download data over different types of wireless networks may vary from device to device.

One of the most common types of data received by a mobile device is message data. In most instances, the message data is received by a messaging server and is addressed to a messaging account associated with the mobile device. Using either a push protocol or a pull protocol, the mobile device receives message data from the messaging server. In many modern implementations, ActiveSync™ or a similar protocol may be used to supply near real-time message data to update (sync) a local mailbox on the mobile device to a corresponding remote mailbox on the messaging server.

Message data may include email in some instances, but may also include instant messages, text messages (SMS or MMS), or other types of text and graphics communications. In general, the message data includes a message, which includes a message body and header information. The header information may include the sender, recipient, subject line, and other metadata regarding the message. The message body includes the text of the message (which may be plain text, HTML, XML, or other formats). The message data may further include attachments.

Message attachments may be large in some instances. In some mobile device messaging systems, attachments are not sent until specifically requested by a mobile device user so as to preserve bandwidth. This may lead to a situation where the user of a mobile device reads a newly-received message but is then frustrated by having to specifically request download of each attachment. In some cases, such as when travelling by subway or other in other situations in which the data connection is not readily available, this may mean the user must wait until a data connection is re-established before downloading the attachment.

It would be advantageous to provide for an improved method and device for message attachment transmission.

BRIEF DESCRIPTION OF THE DRAWINGS

Reference will now be made, by way of example, to the accompanying drawings which show example embodiments of the present application and in which:

FIG. 4 is a block diagram illustrating components of an example mobile electronic device in accordance with example embodiments of the present disclosure.

Like reference numerals are used in the drawings to denote like elements and features.

DETAILED DESCRIPTION OF EXAMPLE EMBODIMENTS

In one aspect, the present disclosure describes a method of transmitting message data to a mobile device from a messaging server over a data connection, wherein a message includes one or more attachments, and an initial data limit is associated with message transmissions to the mobile device, wherein the mobile device receives at least part of the message and a list of the attachments. The method includes identifying any of the one or more attachments that are of a first type of attachment; requesting transmission, from the messaging server to the mobile device, of the identified attachments of the first type, if any; determining the remaining transmission capacity by subtracting the collective size of the at least part of the message and the identified attachments of the first type, if any, from the initial data limit; and, based on the remaining transmission capacity, determining that at least one of the one or more attachments, other than the identified attachments, has a size smaller than the remaining transmission capacity, and based on that determination, requesting transmission of said at least one of the one or more attachments from the messaging server to the mobile device.

In yet another aspect, the present disclosure describes a mobile device to receive message data from a messaging server over a data connection, wherein a message includes one or more attachments, and an initial data limit is associated with message transmissions to the mobile device, and wherein the mobile device receives at least part of the message and a list of the attachments. The mobile device includes a processor; memory storing the initial data limit, the at least part of the message and the list of the attachments; and a messaging application containing processor-executable instructions which, when executed by the processor, cause the processor to perform one or more of the methods described herein.

In yet another aspect, the present disclosure describes a computer-readable medium storing processor-executable instructions which, when executed, cause a processor to perform one or more of the methods described herein.

Other example embodiments of the present disclosure will be apparent to those of ordinary skill in the art from a review of the following detailed descriptions in conjunction with the drawings.

Figure 1:
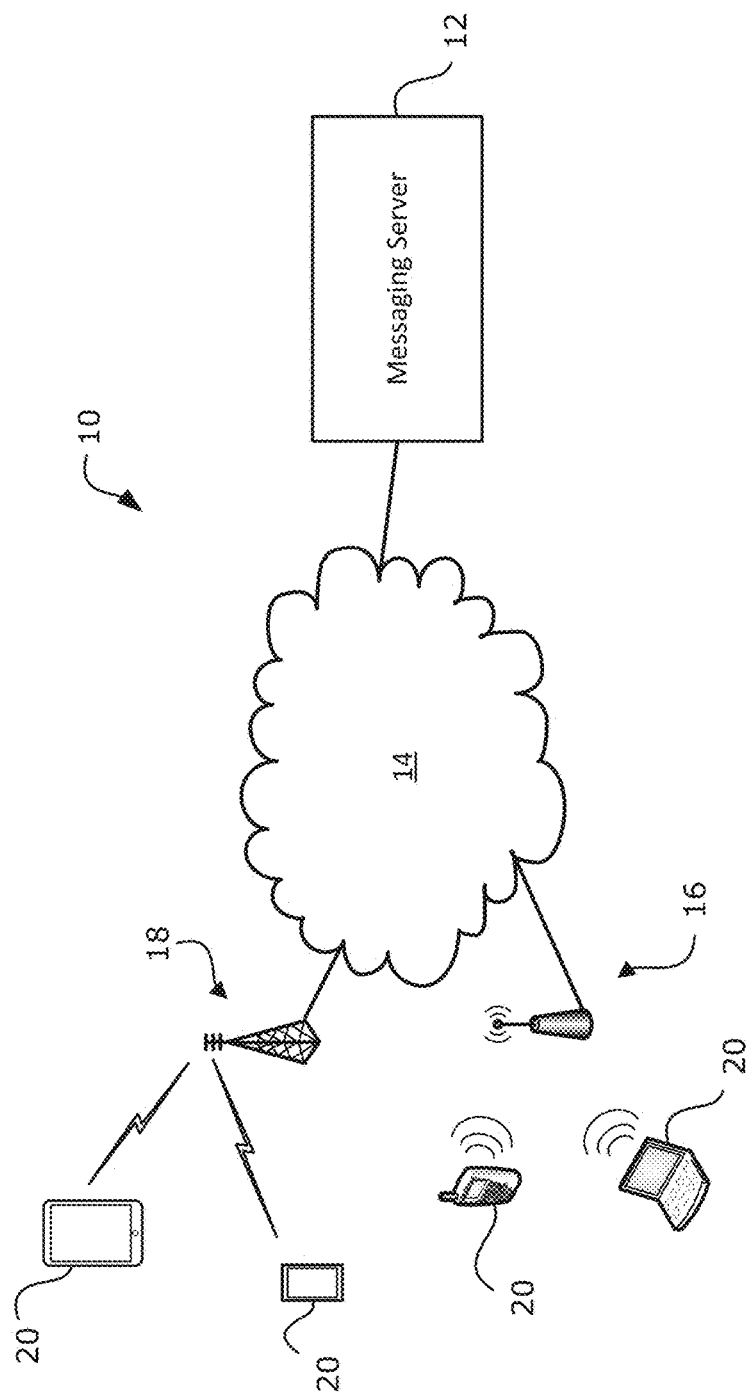
FIG. 1 shows an example system for transmitting messages from a messaging server to a mobile device.

FIG. 1 shows one example embodiment of a messaging system 10. The messaging system 10 includes a messaging server 12 and one or more mobile devices 20. The mobile devices 20 may include handheld smartphones, tablets, laptops, or any other electronic device configured for connection over wireless networks. The mobile devices 20 are configured to connect to the messaging server 12 using a data connection established via one or more networks, including one or more wireless networks. The wireless networks may include a cellular network 18. The cellular network 18 implements one or more protocols for data communications with mobile devices 20 connected to the network 18, such as, for example, HSPA+, LTE, UMTS, or other protocols for data communication. The wireless networks may also include wireless local area networks (WLANs) 16, such as, for example WiFi networks, WiMAX networks, or the like. The data communication between the mobile devices 20 and the messaging server 12 traverses one or more data networks 14, such as the Internet. It will be appreciated that the data connection between the messaging server 12 and the mobile device 20 may include a number of intermediate devices, including proxy servers, relays, routers, switches, and other network equipment.

The mobile devices 20 are configured with messaging software that synchronizes with a mailbox at the messaging server 12. The messaging server 12 maintains a plurality of "mailboxes" relating to respective messaging accounts. In some embodiments, the messages may be email messages and the messaging server may be an email server, such as a Microsoft™ Exchange™ server, for example. In some cases, the messaging server may be a web-based email server, such as a Gmail™ server, for example. The present application is not limited to email and the messages may include any type of message that features attachments and that relies upon a messaging server to relay incoming messages to the mobile device 20. In some instances, the messages may include instant messages, text messages (SMS), and multi-media messages (MMS). The messages referred to in the present application are those that feature a message header (metadata), a message body, and one or more attachments (inline or appended).

In some embodiments, the mobile device 20 polls or queries the messaging server 12 for new message data, perhaps periodically. In response, the messaging server 12 sends any newly-arrived message data or other updates (e.g. messages deleted from mailbox, sent messages, etc.). The synchronization poll-and-update may extend to other non-message related items, such as calendar, notes, reminders, or other data for other applications, in some implementations.

In some other embodiments, the mobile device 20 sends an update request which is left pending at the messaging server 12 until new message data (or other updates) are detected. This may be termed a "hanging sync" in some instances.

When the messaging server 12 sends new message data to the mobile device 20, it initially sends metadata (e.g. message header information such as subject, to field, from field, cc field, etc.), at least a portion of the message body, and a list of attachments and their respective sizes. The amount of the message body to be sent to the device 20 may be subject to an initial data limit. The initial data limit may result in truncation of the message body if the message body is too large.

The initial data limit may be set by the mobile device 20 and communicated to the messaging server 12 in the polling request or in another earlier data communication. It may be stored at the messaging server 12 in association with the mailbox or messaging account linked to the mobile device 20. It may be set by an administrator as part of a corporate or network-wide policy. It may be user-configurable in some instances. Howsoever the limit is set, the initial data limit imposes a cap on the quantity of message data that may be initially sent from the messaging server 12 to the mobile device 20 in relation to a new message.

In some embodiments, the mobile device 20 and/or messaging server 12 may have context-dependent initial data limits. For example, more than one initial data limit may be defined for use in different situations, such as dependent upon the type of network connection. In one embodiment, the mobile device 20 may have a first initial data limit if communicating over a WiFi network and a second initial data limit if communicating over a cellular network, since cellular network data communication may be subject to higher costs and/or usage limits. In another embodiment, the cellular-specific data limit may include a data limit for cellular data connections over the home network and a different data limit for cellular data connections when roaming. In any embodiment, the initial data limits may include a specified per-message data cap, such as 1 MB, 5 MB, 10 MB, etc., unlimited, or zero MB.

The mobile device 20 may be configured to determine the type of data connection currently in use for communicating with the messaging server 12. Based on the type of data connection, the mobile device 20 selects a pre-determined initial data limit associated with that type of data connection. It then relies upon that initial data limit to govern the amount of data obtained from the messaging server 12 in connection with a new message. Some example processes for determining which attachments to download/transmit are described below.

In one embodiment, the messaging server 12 and/or mobile device 20 are configured to never download attachments to messages unless the mobile device 20 receives input of a specific user request for the attachments. This may include inline attachments, security attachments, or any other types of attachments. This results in delay for display of message content and poor user experience in cases where some of the attachments, or even all of them, could have been obtained by the mobile device 20 without violating the initial data limit. Accordingly, as described below, in some embodiments the messaging server 12 and/or the mobile device 20 determine which attachments to transmit/download based upon the initial data limit.

Attachments to a message may be categorized into various types. A first type of attachment includes high priority attachments, for example those that are necessary to understand the content of the message or that are of an urgent or time-sensitive nature. An example of a first-type attachment is a cryptographic attachment, such as a public key or certificate. For instance, an S/MIME email may include an S/MIME signature attachment. Other attachments may also be considered high priority and, thus, first-type attachments. For example, a calendar-related attachment in an invite email may be considered high priority since the invite email is less functional if the calendar item is unavailable to the person attempting to read and respond to the invite.

A second type of attachment includes inline attachments. Inline attachments are those that are intended to be rendered or actionable in the body of the message. For example, graphic elements, such as images, pictures, icons, logos, etc., may be embedded within the structure of a message body, such as an HTML-format email, with the intention that the email viewer render them "inline" within the text and formatting of the email when displaying the message content. Inline attachments may include non-graphic files, including video clips, audio clips, or other multi-media files.

A third type of attachment includes all those attachments that are not first-type or second-type attachments. Example third-type attachments may include word processing files (e.g. Word™ documents), mark-up language documents (e.g. PDF files), non-inline images (e.g. JPEG or PNG files), encrypted files (e.g. ZIP files), audio/video files (e.g. WAV files), etc.

In some instances, the third type of attachment may be further subdivided into third and fourth types if there is a category of such attachment that is deemed of higher priority for immediate download/transmission. For example, in one embodiment it may be considered that images are more likely to be requested that other third-type attachments, so they may be prioritized over other third-type attachments.

In some of the embodiments herein, the mobile device 20 and/or messaging server 12 may be configured to automatically transmit the first-type attachments, such as certificates, calendar invites, etc. The mobile device 20 (or messaging server 12, in some embodiments), may evaluate the size of the received message body (with or without including the metadata/header information) and first-type attachments, and then subtract that from the initial data limit to determine the remaining transmission capacity.

The mobile device 20 may then evaluate whether the message includes any second-type attachments, i.e. inline attachments, and their size. Because inline attachments impact the formatting and readability of the message content, in some embodiments the mobile device 20 may determine that it will either download all of them or none of them since downloading only some of them may result in a confusing rendering of the message content. Accordingly, in these embodiments, the mobile device 20 evaluates whether the collective size of the second-type attachments is less than the remaining transmission capacity and, if so, then it requests download of those attachments.

In another embodiment, the inline attachments may be subdivided into still-graphic elements (e.g. images, logos, icons, etc.) and non-still-graphic elements (e.g. video, audio, etc.). The mobile device 20 may first evaluate whether it may obtain all the still-graphic elements within the remaining transmission capacity and, if so, it requests them. It may then evaluate whether it may also obtain the non-still-graphic elements within the remaining transmission capacity and, if so, request them as well.

After determining whether it will obtain the second-type attachments, if any, the mobile device 20 may then update the remaining transmission capacity (e.g. by subtracting the collective size of any second-type attachments requested or to-be requested). The updated remaining transmission capacity may then be used to determine whether to request download of any of the third-type attachments, if any.

If there is more than one third-type attachment, the mobile device 20 may use some policy or logic rule(s) to select which of the attachments to consider downloading first. In one example, the selection is based on the relative size of the attachments. For example, the mobile device 20 may start by considering the largest third-type attachment and work towards the smallest, considering each in turn, updating the remaining transmission capacity as it identifies attachments to download within the allotted capacity. Alternatively, the mobile device 20 may start with smallest and work towards largest. In the latter case, the mobile device 20 will stop evaluating files once it encounters an attachment that is too large to fit within the updated remaining transmission capacity since all successive files will be even larger.

In yet other embodiments, the mobile device 20 may select third-type attachments for consideration for download based upon a predetermined hierarchy or prioritizing of type. For example, in some embodiments graphics files may be preferred to other files, or mark-up language files may be preferred to word processing documents, etc. Any suitable relative ranking or prioritizing based on file type may be used in a given embodiment and may be user-configurable on the mobile device 20 in some instances.

It will be appreciated that although the above-description presumes that the mobile device 20 evaluates the attachments and determines which of them to request/download under the data capacity restrictions, in some embodiments those functions may be implemented at the messaging server 12, which may evaluate which attachments to send to the mobile device 20. In some cases, the mobile device 20 may send its initial data limit to the messaging server 12, for example in a sync or poll message, or the messaging server 12 may have a stored initial data limit associated with the mobile device 20 or a category of mobile devices into which the mobile device 20 falls.

At the mobile device 20, having received the attachments determined to fit within the initial data limit, the mobile device 20 stores the received message data in memory. The mobile device 20 renders, in response to user selection of the message in a mailbox interface or the like, the content of the message. The rendering of the content of the message may include rendering any inline attachments, if downloaded and available. If the message body was truncated due to size, then the mobile device 20 may graphically signal the truncation of message on the display screen using a button, icon, text, or the like. In addition, if there are attachments that have not been download, the mobile device 20 may graphically signal the attachments available to be download, including, in some cases, their respective sizes. In some instances, a single button or actionable icon may be rendered to receive input of a download request for all attachments, with the collective size of the attachments indicated. In other instances, a button or actionable icon for each available attachment may be provided.

Figure 2:
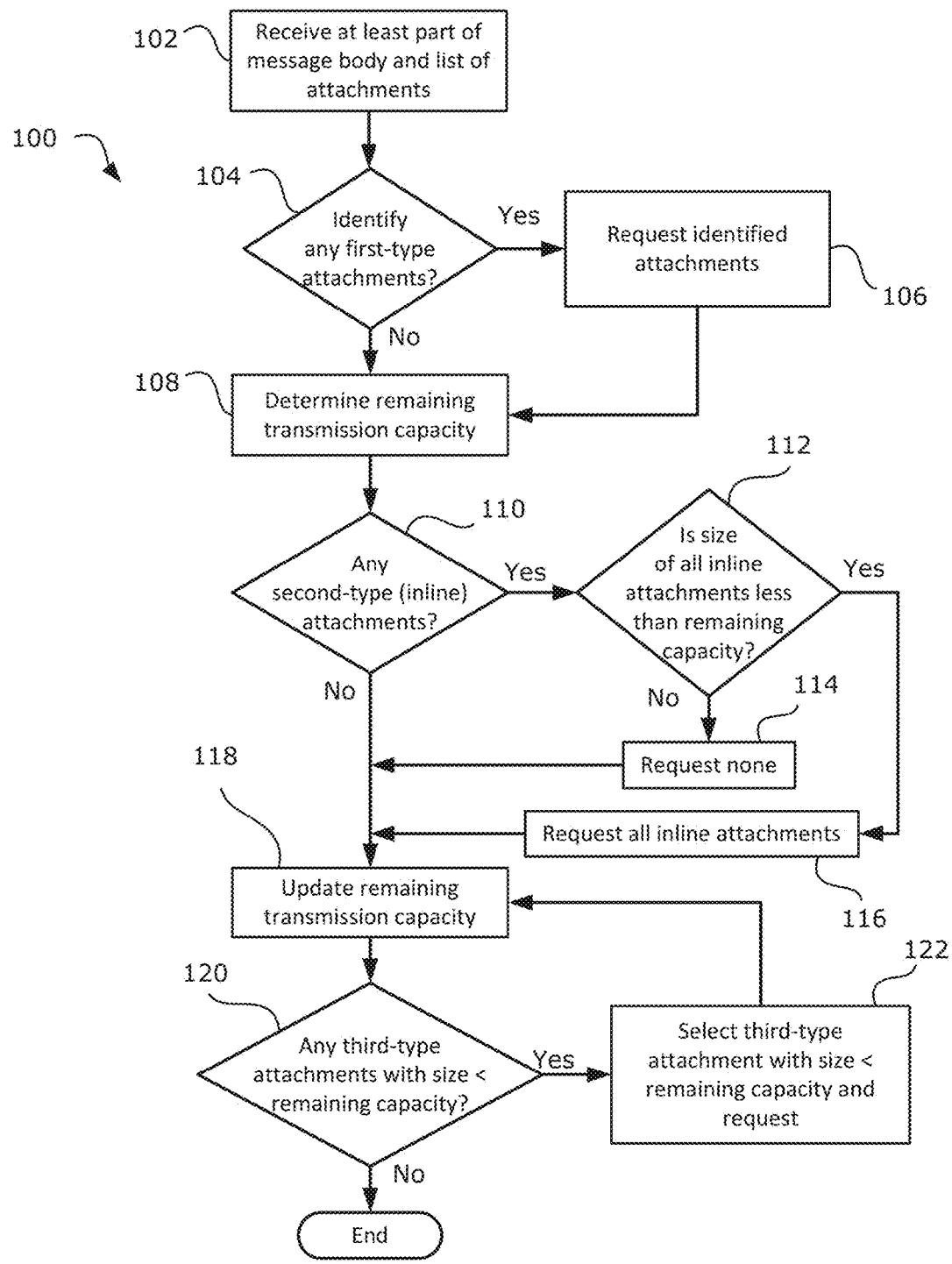
FIG. 2 shows, in flowchart form, one example method for transmitting message attachments from a messaging server to a mobile device.

Reference is now made to FIG. 2, which shows, in flowchart form, one example method 100 for message attachment transmission. The method 100, in this example, may be implemented by the mobile device. In another example, the method 100 may be implemented by the messaging server, or partly by the mobile device and partly by the messaging server. In yet another example, all or part of the method 100 may be implemented using an intermediate device between the mobile device and the messaging server, such a relay or other network element.

The method 100 relates to receipt of a new message at a messaging server in connection with a messaging account associated with a mobile device. The new message includes one or more attachments. The mobile device may send a request to the messaging server for new message data. In response, the messaging server may identify whether any new messages are available and, as a result, locate the new message received for the messaging account. The messaging server may then send message data to the mobile device, as indicated by operation 102. In particular, the mobile device receives header information (metadata) for the message, at least part of the message body, and a list of attachments to the message. The list of attachments may provide file names, files types, and file size data.

The method 100 then includes an operation 104 of identifying any first-type attachments based on the received list of attachments. As noted above, the first-type attachments may include those relating to encryption, calendar invites, or other attachment types categorized as urgent or high priority. If so, then in operation 106, those identified attachments are transmitted to the mobile device. In some embodiments, the first-type attachments may be identified by the messaging server and sent with the message body in operation 102.

In operation 108, the mobile device evaluated the remaining transmission capacity by subtracting the size of the data received in operation 102 and 106 (if any) from the initial data limit. In some cases, this evaluation may or may not take into account the size of the metadata. The remaining transmission capacity determined in operation 108 governs whether additional attachments, if any, may be obtained under the initial data limit.

In operation 110, the mobile device determines, from the list of attachments, whether any of the attachments are second-type attachments, i.e. inline attachments. If so, then in operation 112 the mobile device assesses whether the collective size of the inline attachments is smaller than the remaining transmission capacity. If not, then none of them are requested as indicated by operation 114; however, if the remaining transmission capacity is sufficiently large to accommodate download of all the inline attachments, then they are requested by the mobile device as indicated by operation 116.

The mobile device then updates the remaining transmission capacity in operation 118.

In operation 120, the mobile device determines if there are any remaining attachments that are not first-type or second-type attachments and that are small enough to fit within the updated remaining transmission capacity. If so, then in operation 122 the mobile device selects one such attachment for download and sends a request for the attachment to the messaging server (or queues the request to combine it with any other requests in a single request for particular attachments). The remaining transmission capacity is then updated again in operation 118. The mobile device continues to evaluate whether there are attachments that may be obtained within the remaining transmission capacity until there are no further third-type attachments that may be so obtained.

It will be understood that the selection and request for third-type attachments in operations 120 and 122 may be implemented in a number of ways. As described above, the mobile device may begin by selecting the largest of the attachments that fits within the remaining transmission capacity and work towards the smallest, or may start with the smallest and work towards the largest until one no longer fits. The mobile device may also or alternatively prioritize certain files types for selection. Other mechanisms may also be used to select and request attachments for download within the remaining transmission capacity.

Figure 3:
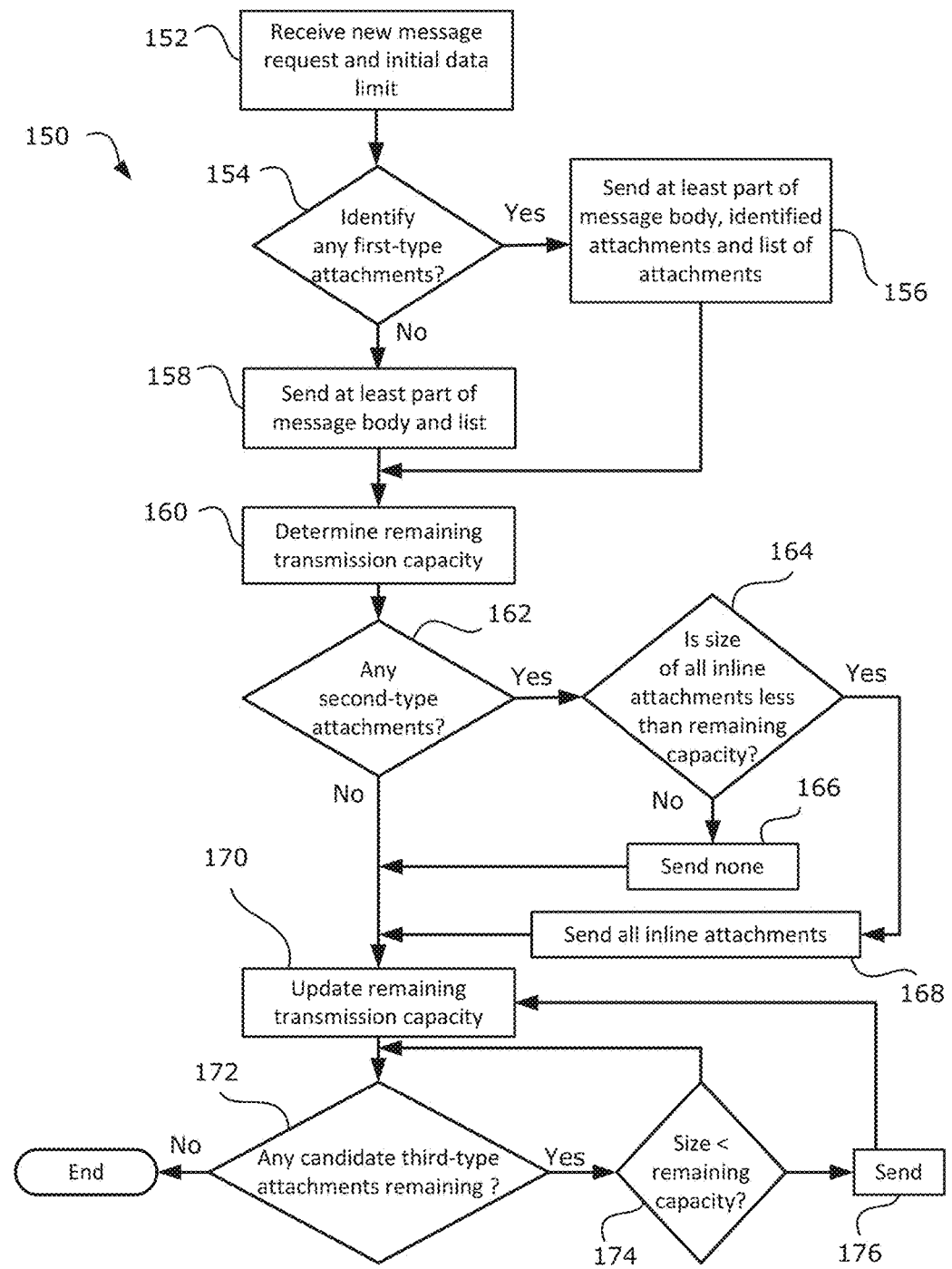
FIG. 3 shows, in flowchart form, another example method for transmitting message attachments from a messaging server to a mobile device.

Reference is now made to FIG. 3, which shows, in flowchart form, another example method 150 for message attachment transmission. This example method 150 is implemented wholly or partly by the messaging server.

The method 150 begins in operation 152 with receipt at the messaging server of a new message request from the mobile device. The request may include an indication of the initial data limit associated with communications to the mobile device, or this limit may have been previously received by the messaging server and stored in memory in association with the mobile device. The example method 150 presumes that a new message having one or more attachments has been received in connection with the messaging account associated with the mobile device.

In operation 154, the server determines whether any of the attachments to the new message are of the first type. If so, then in operation 156, the messaging server sends to the mobile device the message header, at least part of the body of the message, the first-type attachments, and a list of all the attachments to the message. If there are no first-type attachments, then in operation 158 the server sends the header, at least part of the message body, and the list of attachments.

In operation 160, the messaging server identifies whether there is any remaining capacity by subtracting the size of the sent data (header, body, and first-type attachments) from the initial data limit. The remaining transmission capacity provides the threshold for determining whether any further attachments may be sent to the mobile device.

In operation 162, the messaging server determines if any of the attachments are inline (second-type) attachments. If so, then in operation 164 it assesses whether the collective size of the inline attachments is smaller than the remaining transmission capacity. If so, then it sends all the inline attachments as indicated by operation 168. If not, then none of the inline attachments are sent, as indicated by operation 166.

If necessary, the remaining transmission capacity is updated in operation 170.

In operation 172, the messaging server determines whether there are any candidate third-type attachments remaining. A third-type attachment may be considered a "candidate" based on it not having already been evaluated and excluded, or it may be based on its file type, or it may be based on an ordering of attachments (perhaps size-based) for consideration as candidates, etc. If so, then in operation 174 the size of the file is compared to the remaining transmission capacity. If small enough, then the file is sent in operation 176 and the remaining transmission capacity is updated in operation 170 before returning to operation 170 to assess whether there are further candidate attachments to evaluate. If the file is too large, then the method 150 returns to operation 170 to assess whether there are further candidate attachments to evaluate.

The above-discussed example methods 100 and 150 are illustrative and not restrictive. It will be understood in light of the present description that various operations may be performed in a different order and that some operations may be eliminated or modified in some embodiments without significantly affecting or changing the operation of the method.

Reference will now be made to FIG. 4 which illustrates an example electronic device 201. In the illustrated example embodiment, the electronic device 201 is a mobile communication device. In at least some example embodiments, the mobile communication device is a two-way communication device having data and possibly voice communication capabilities, and the capability to communicate with other computer systems; for example, via the internet. As noted above, the electronic device 201 may take other forms in other embodiments.

The electronic device 201 of FIG. 4 includes a housing (not shown) which houses components of the electronic device 201. Internal components of the electronic device 201 may be constructed on a printed circuit board (PCB). The electronic device 201 includes a controller including at least one processor 240 (such as a microprocessor) which controls the overall operation of the electronic device 201. The processor 240 interacts with device subsystems such as a wireless communication subsystem 211 for exchanging radio frequency signals with a wireless network to perform communication functions. The processor 240 interacts with additional device subsystems including one or more input interfaces 206 (such as a keyboard, one or more control buttons, one or more microphones 258, a gesture sensor 261, and/or a touch-sensitive overlay associated with a touch-screen display), flash memory 244, random access memory (RAM) 246, read only memory (ROM) 248, auxiliary input/output (I/O) subsystems 250, a data port 252 (which may be a serial data port, such as a Universal Serial Bus (USB) data port), one or more output interfaces (such as a display 204 (which may be a liquid crystal display (LCD)), one or more speakers 256, or other output interfaces), a short-range communication subsystem 262, and other device subsystems generally designated as 264.

The electronic device 201 may include a touchscreen display in some example embodiments. The touchscreen display may be constructed using a touch-sensitive input surface connected to an electronic controller. The touch-sensitive input surface overlays the display 204 and may be referred to as a touch-sensitive overlay. The touch-sensitive overlay and the electronic controller provide a touch-sensitive input interface and the processor 240 interacts with the touch-sensitive overlay via the electronic controller. That is, the touchscreen display acts as both an input interface and an output interface.

The electronic device 201 may communicate with any one of a plurality of fixed transceiver base stations of the wireless network within its geographic coverage area using the communication subsystem 211. The electronic device 201 may send and receive communication signals over the wireless network after the required network registration or activation procedures have been completed.

In some example embodiments, the auxiliary input/output (I/O) subsystems 250 may include an external communication link or interface, for example, an Ethernet connection. The communication subsystem 211 may include other wireless communication interfaces for communicating with other types of wireless networks; for example, WiFi networks.

In some example embodiments, the electronic device 201 also includes a removable memory module 230 (typically including flash memory) and a memory module interface 232. Network access may be associated with a subscriber or user of the electronic device 201 via the memory module 230, which may be a Subscriber Identity Module (SIM) card for use in a GSM network or other type of memory module for use in the relevant wireless network type. The memory module 230 may be inserted in or connected to the memory module interface 232 of the electronic device 201.

The electronic device 201 may store data 227 in an erasable persistent memory, which in one example embodiment is the flash memory 244. In various example embodiments, the data 227 may include service data having information required by the electronic device 201 to establish and maintain communication with the wireless network. The data 227 may also include user application data such as email messages, address book and contact information, calendar and schedule information, notepad documents, image files, and other commonly stored user information stored on the electronic device 201 by its user, and other data. In some embodiments of the present application, the data 227 includes one or more initial data limits 302 that set a threshold for the quantity of data to be downloaded from a messaging server for a new message.

The data 227 stored in the persistent memory (e.g. flash memory 244) of the electronic device 201 may be organized, at least partially, into a number of databases or data stores each containing data items of the same data type or associated with the same application. For example, email messages, contact records, and task items may be stored in individual databases within the electronic device 201 memory.

The electronic device 201 also includes a battery 238 as a power source, which is typically one or more rechargeable batteries that may be charged, for example, through charging circuitry coupled to a battery interface 236 such as the serial data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The short-range communication subsystem 262 is an additional optional component which provides for communication between the electronic device 201 and different systems or devices, which need not necessarily be similar devices. For example, the short-range communication subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications may be installed on the electronic device 201 during or after manufacture. Additional applications and/or upgrades to an operating system 222 or software applications 224 may also be loaded onto the electronic device 201 through the wireless network, the auxiliary I/O subsystem 250, the data port 252, the short-range communication subsystem 262, or other suitable device subsystems 264. The downloaded programs or code modules may be permanently installed; for example, written into the program memory (e.g. the flash memory 244), or written into and executed from the RAM 246 for execution by the processor 240 at runtime.

The processor 240 operates under stored program control and executes software modules 220 stored in memory such as persistent memory; for example, in the flash memory 244. As illustrated in FIG. 4, the software modules 220 may include operating system software 222 and one or more additional applications 224 or modules such as, for example, a messaging application 300. In the example embodiment of FIG. 4, the messaging application 300 is illustrated as being implemented as a stand-alone application 224, but in other example embodiments, the messaging application 300 could be implemented as part of the operating system 222 or another application 224.

The messaging application 300 is configured to connect to the remote messaging server and to obtain new message data from the server. It further provides a user interface for rendering on the display 204 to display message content and to receive user input in relation to the message content, such requests for further content or attachments when not initially downloaded.

While the present application includes some descriptions of methods, a person of ordinary skill in the art will understand that the present application is also directed to various apparatus such as a handheld electronic device and a server. The handheld electronic device and the server include components for performing at least some of the example aspects and features of the described methods, be it by way of hardware components (such as the memory and/or the processor), software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present application.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Example embodiments of the present application are not limited to any particular operating system, system architecture, mobile device architecture, server architecture, or computer programming language.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method of transmitting message data to a mobile device from a messaging server over a data connection, wherein a message includes one or more attachments, an initial data limit is associated with message transmissions to the mobile device, and wherein the mobile device receives at least part of the message and a list of the attachments, the method comprising:
   identifying, by the mobile device, any of the one or more attachments that are of a first type of attachment, wherein the first type of attachments includes attachments that are cryptography-related or calendar items;
   requesting, by the mobile device, transmission, from the messaging server to the mobile device, of the identified attachments of the first type, if any;
   determining, by the mobile device, the remaining transmission capacity by subtracting the collective size of the at least part of the message and the identified attachments of the first type, if any, from the initial data limit; and
   based on the remaining transmission capacity,
      determining that at least one of the one or more attachments, other than the identified attachments, has a size smaller than the remaining transmission capacity, and based on that determination, requesting, by the mobile device, transmission of said at least one of the one or more attachments from the messaging server to the mobile device,
   wherein determining that at least one of the one or more attachments has a size smaller than the remaining transmission capacity comprises:
      determining that at least one of the one or more attachments comprises inline attachments that affect formatting of message content of the message and that a cumulative size of such inline attachments is smaller than the remaining transmission capacity; and
      requesting all said inline attachments and updating the remaining transmission capacity.

2. The method claimed in claim 1, further comprising determining whether any further attachments, excluding the first-type attachments and the inline attachments, are available and, if so, selecting an attachment having a size less than the updated remaining transmission capacity and requesting download of that selected attachment.

3. The method claimed in claim 1, wherein determining that at least one of the one or more attachments has a size smaller than the remaining transmission capacity, comprises:
   for each of the one or more attachments excluding the first-type attachments,
      when that attachment has a size smaller than the remaining transmission capacity, requesting transmission of that attachment from the messaging server to the mobile device and updating the remaining transmission capacity before evaluating the next attachment.

4. The method claimed in claim 3, wherein the evaluating is performed in a smallest-to-largest order and ends if an attachment with a size larger than the remaining transmission capacity is reached.

5. The method claimed in claim 3, wherein the evaluating is performed in a largest-to-smallest order.

6. The method claimed in claim 1, further comprising determining the initial data limit, and wherein the determining the initial data limit comprises selecting a limit based on a type of wireless network to which the mobile device is connected.

7. A mobile device to receive message data from a messaging server over a data connection, wherein a message includes one or more attachments, an initial data limit is associated with message transmissions to the mobile device, and wherein the mobile device receives at least part of the message and a list of the attachments, the mobile device comprising:
   a processor;
   memory storing the initial data limit, the at least part of the message and the list of the attachments; and
   a messaging application containing processor-executable instructions which, when executed by the processor, cause the processor to:
      identify any of the one or more attachments that are of a first type of attachment, wherein the first type of attachments includes attachments that are cryptography-related or calendar items;
      request transmission, from the messaging server to the mobile device, of the identified attachments of the first type;
      determine the remaining transmission capacity by subtracting the collective size of the at least part of the message and the identified attachments of the first type from the initial data limit; and
      based on the remaining transmission capacity,
         determine that at least one of the one or more attachments, other than the identified attachments, has a size smaller than the remaining transmission capacity, and based on that determination, request transmission of said at least one of the one or more attachments from the messaging server to the mobile device,
wherein the processor is to determine that at least one of the one or more attachments has a size smaller than the remaining transmission capacity by:
  determining that at least one of the one or more attachments comprise inline attachments that affect formatting of message content of the message and that a cumulative size of such inline attachments is smaller than the remaining transmission capacity; and
  requesting all said inline attachments and updating the remaining transmission capacity.

8. The mobile device claimed in claim 7, wherein the instructions, when executed, further cause the processor to determine whether any further attachments, excluding the first-type attachments and the inline attachments, are available and, if so, to select an attachment having a size less than the updated remaining transmission capacity and request download of that selected attachment.

9. The mobile device claimed in claim 7, wherein the processor is to determine that at least one of the one or more attachments has a size smaller than the remaining transmission capacity by:
  for each of the one or more attachments excluding the first-type attachments,
    when that attachment has a size smaller than the remaining transmission capacity, requesting transmission of that attachment from the messaging server to the mobile device and updating the remaining transmission capacity before evaluating the next attachment.

10. The mobile device claimed in claim 7, wherein the memory stores a plurality of initial data limits, and wherein the instructions further cause the processor to select one of the initial data limits based on the type of wireless network to which the mobile device is connected.

11. The mobile device claimed in claim 10, wherein the plurality of initial data limits includes a first data limit associated with a cellular network connection and a second data limit associated with a WLAN connection.

12. A non-transitory computer-readable medium storing processor-executable instructions for transmitting message data to a mobile device from a messaging server over a data connection, wherein a message includes one or more attachments, and an initial data limit is associated with message transmissions to the mobile device, wherein the mobile device receives at least part of the message and a list of the attachments, and wherein the instructions comprise:
  instructions to identify, by the mobile device, any of the one or more attachments that are of a first type of attachment, wherein the first type of attachments includes attachments that are cryptography-related or calendar items;
  instructions to request, by the mobile device, transmission, from the messaging server to the mobile device, of the identified attachments of the first type;
  instructions to determine, by the mobile device, the remaining transmission capacity by subtracting the collective size of the at least part of the message and the identified attachments of the first type from the initial data limit; and
  based on the remaining transmission capacity,
    instructions to determine that at least one of the one or more attachments, other than the identified attachments, has a size smaller than the remaining transmission capacity, and based on that determination, to request, by the mobile device, transmission of said at least one of the one or more attachments from the messaging server to the mobile device,
wherein determining that at least one of the one or more attachments has a size smaller than the remaining transmission capacity comprises:
  determining that at least one of the one or more attachments comprise inline attachments that affect formatting of message content of the message and that a cumulative size of such inline attachments is smaller than the remaining transmission capacity; and
  requesting all said inline attachments and updating the remaining transmission capacity.

* * * * *